(12) United States Patent
Hattori

(10) Patent No.: US 8,352,481 B2
(45) Date of Patent: Jan. 8, 2013

(54) SERVER, DATA TRANSFER METHOD, AND RECORDING MEDIUM

(75) Inventor: Masakazu Hattori, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 673 days.

(21) Appl. No.: 12/357,468

(22) Filed: Jan. 22, 2009

(65) Prior Publication Data

US 2009/0198705 A1    Aug. 6, 2009

(30) Foreign Application Priority Data

Jan. 31, 2008   (JP) .................................. 2008-021594

(51) Int. Cl.
*G06F 7/02* (2006.01)
*G06F 17/30* (2006.01)

(52) U.S. Cl. ......... 707/757; 707/769; 707/778; 707/803

(58) Field of Classification Search .............. 707/3, 101, 707/103 R, 999.003, 999.101, 999.103, 722, 707/755, 778, 797, 803, 999.1, 999.107, 707/757

See application file for complete search history.

(56) References Cited

U.S. PATENT DOCUMENTS

| 6,564,219 B1 * | 5/2003 | Lee et al. ...................... 707/769 |
| 2002/0138700 A1 * | 9/2002 | Holmberg ..................... 711/137 |
| 2005/0192983 A1 * | 9/2005 | Hattori et al. ................. 707/100 |

FOREIGN PATENT DOCUMENTS

JP            10-069488         3/1998

* cited by examiner

*Primary Examiner* — Bruce Moser
(74) *Attorney, Agent, or Firm* — Turocy & Watson, LLP

(57) ABSTRACT

A receiving unit receives a processing request from a client, requesting acquisition of data including a plurality of elements from a database. An acquiring unit acquires first data and data structure information from the database in response to the first processing request. A generating unit replaces a first element with a first identifier and generates a second data including the first identifier and the second elements. A transmitting unit transmits the second data to the client.

14 Claims, 11 Drawing Sheets

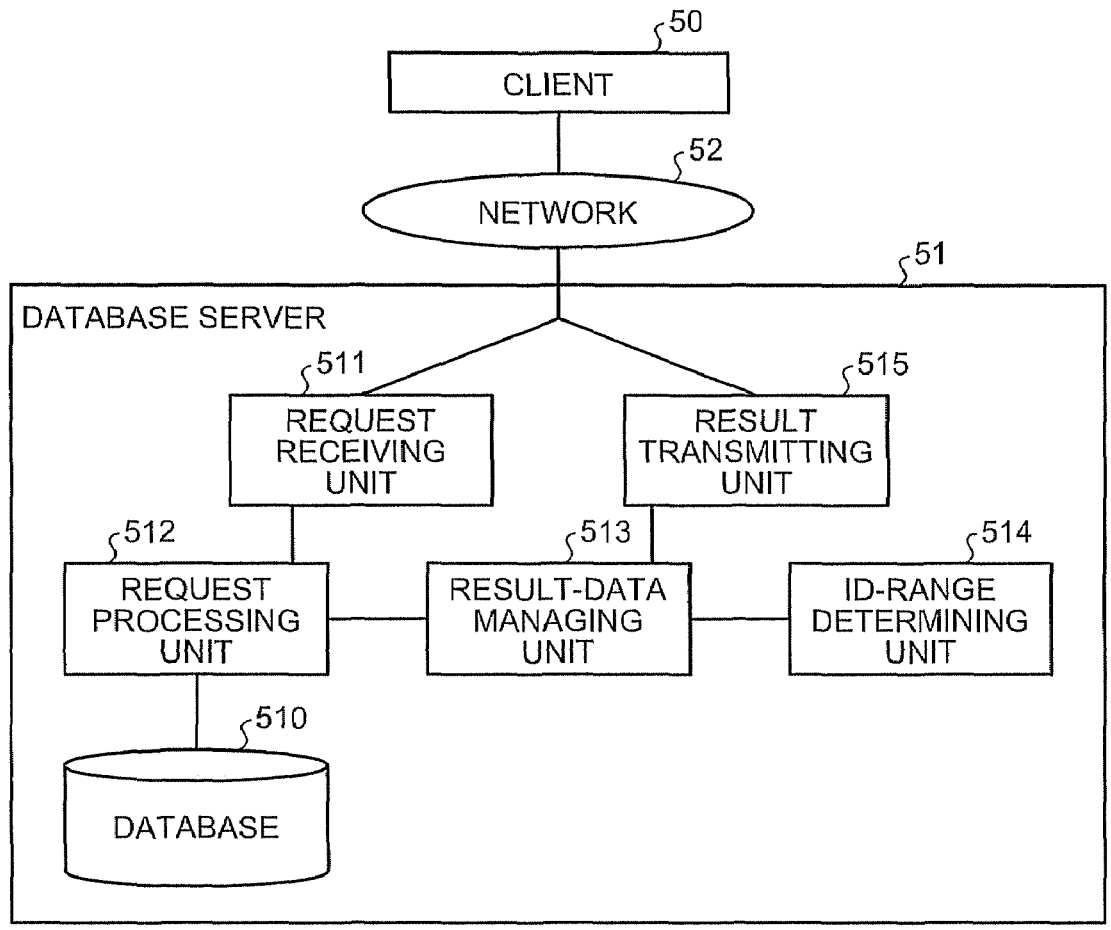

FIG.13

```
for $x in //paper
where contains ($x, "XML")
return $x
```

FIG.14

```
scanPath (//paper);
scanData (.);
testContains (., "XML");
sendXML (paper);
```

SERVER, DATA TRANSFER METHOD, AND RECORDING MEDIUM

CROSS-REFERENCE TO RELATED APPLICATIONS

This application is based upon and claims the benefit of priority from the prior Japanese Patent Application No. 2008-21594, filed on Jan. 31, 2008; the entire contents of which are incorporated herein by reference.

BACKGROUND OF THE INVENTION

1. Field of the Invention

The present invention relates to a server that performs a data transfer with a client, a data transfer method, and a computer-readable recording medium.

2. Description of the Related Art

Conventionally, there have been database servers that search for data stored in a database and transfer the data as a search result to a client. Recently, to accommodate huge data, a distributed database system has been established, in which a plurality of database servers respectively having a database and a coordinator server are connected with each other via a network. In such a distributed database system, a client receives the data as the search result from the database server via the coordinator server. In the distributed database system, because the data is distributed and arranged in a plurality of databases, the coordinator server can access the database servers in parallel. Therefore, performance improvement corresponding to the number of databases can be expected. On the other hand, data transfer on the network required for transferring data between the coordinator server and the database server or between the database servers increases an overhead considerably. The same can be mentioned for a network interconnected at a high speed. Therefore, distribution effect largely decreases and the expected performance improvement may not be desired.

To deal with such a problem, a method of compressing data transferred between servers (transfer data) has been proposed. For example, Japanese Patent No. 3747525 proposes a practical method of transferring only record ID from a data server to a front end server at the time of search, and converting the record ID to an actual record in the data server at the time of fetching.

In the method of compressing the transfer data, the effect becomes large as compressibility increases. However, because in a character string with no regularity, the compressibility thereof is about 30%, and it is difficult to greatly reduce the transfer data.

Further, the method described in Japanese Patent No. 3747525 has following two problems. If a transaction in which the record is searched and a result record is sequentially updated is assumed, the effect is sufficient and responsiveness can be improved. However, in a case that a record list of a search result is instantaneously formed as in a normal full text search, a transfer amount of data increases and it is wasteful. Further, in an either-or case such that the transfer data is either record ID or actual record, it can be inconvenient. For example, it is inconvenient in a case that nonstandard data such as extensible markup language (XML) data is handled. In this case, there can be inconveniences such that data is insufficient in the former case, and useless data transfer is made in the latter case. This is because in the case of nonstandard data, the size of the data to be extracted cannot be predicted.

SUMMARY OF THE INVENTION

According to one aspect of the present invention, there is provided a server including a receiving unit that receives a processing request from a client, requesting acquisition of data including a plurality of elements from a database; an acquiring unit that acquires first data and data structure information indicating association between the elements and positioning of the elements in the first data from the database in response to the processing request; a determining unit that determines whether to replace each of the elements with an identifier based on the data structure information to set an element determined to be replaced with the identifier as a first element and the elements other than the first element as second elements; a generating unit that replaces the first element with a first identifier and generates a second data including the first identifier and the second elements; and a transmitting unit that transmits the second data to the client.

Furthermore, according to another aspect of the present invention, there is provided a data transfer method including receiving a processing request from a client, requesting acquisition of data including a plurality of elements from a database; acquiring first data and data structure information indicating association between the elements and positioning of the elements in the first data from the database in response to the processing request; determining whether to replace each of the elements with an identifier based on the data structure information to set an element determined to be replaced with the identifier as a first element and the elements other than the first element as second elements; replacing the first element with a first identifier; generating a second data including the first identifier and the second elements; and transmitting the second data to the client.

Moreover, according to still another aspect of the present invention, there is provided a computer-readable recording medium that stores therein a computer program. The computer program when executed causes a computer to execute receiving a processing request from a client, requesting acquisition of data including a plurality of elements from a database; acquiring first data and data structure information indicating association between the elements and positioning of the elements in the first data from the database in response to the processing request; determining whether to replace each of the elements with an identifier based on the data structure information to set an element determined to be replaced with the identifier as a first element and the elements other than the first element as second elements; replacing the first element with a first identifier; generating a second data including the first identifier and the second elements; and transmitting the second data to the client.

BRIEF DESCRIPTION OF THE DRAWINGS

FIG. 1 is a configuration example of a database system according to a first embodiment of the present invention;

FIG. 2 is an example of a tuple;

FIG. 3 is an example of XML data equivalently converted from the tuple shown in FIG. 2;

FIG. 13 is an example of a data structure of XQuery;

FIG. 14 is an example of a code generated from the XQuery shown in FIG. 13 by a request processing unit;

DETAILED DESCRIPTION OF THE INVENTION

Figure 4:
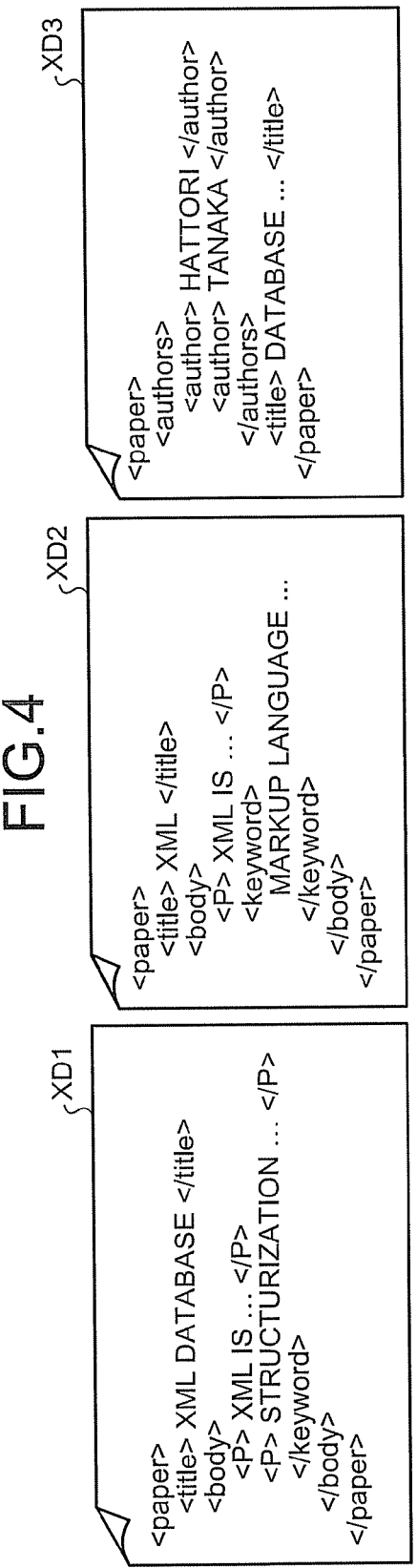
FIG. 4 is an example of three elements of XML data stored in a database.

Exemplary embodiments of the present invention will be explained below in detail with reference to the accompanying drawings.

FIG. 1 is a configuration example of a database system according to a first embodiment of the present invention. The database system according to the first embodiment includes a client computer (hereinafter, "client") 50 that executes an application program, and a database server 51, where the client 50 and the database server 51 are connected via a network 52. The network 52 is, for example, a local area network (LAN), the Intranet, the Ethernet (Registered Trademark), or the Internet.

The client 50 transmits a processing request such as a data acquisition request for requesting acquisition of data to the database server 51 via the network 52, and receives the processing result from the database server 51. The database server 51 includes a database 510 that stores data to acquire data corresponding to the processing request from the client 50 from the database 510, and generates result data by appropriately processing the data to transmit the result data as the processing result to the client 50.

A hardware configuration of the client 50 and the database server 51 is explained here. The client 50 and the database server 51 respectively include a controller such as a central processing unit (CPU) that controls the entire apparatus, memories such as a read only memory (ROM) for storing various data and various programs and a random access memory (RAM), an external memory such as a hard disk drive (HDD) or a compact disk (CD) drive for storing various data and various programs, a communication controller that communicates with an external computer via the network 52, and a bus for connecting these with each other, and have a hardware configuration using a normal computer. A display device such as a display that displays information and an input unit such as a keyboard and a mouse for a user to input various processing requests are connected to the client 50 and the database server 51 with wire or wirelessly. In such a configuration, the database 510 is stored in the external memory included in the database server 51.

The database 510 is a XML database, and stores XML data including a tuple. Normally, a relational database (RDB) in which a relationship between the data is modeled is used as the database. In the RDB, the database is expressed by a set of the tuples, which is a fixed arrangement of columns. There is a structured document database, which models a hierarchy structure of document data. This is a so-called XML database, in which the database is expressed by a set of document data holding a hierarchical relationship or a sibling relationship of the element. The XML has high description capability. The tuple can be expressed as the XML data having a hierarchical relationship of only one tier.

For example, the tuple shown in FIG. 2 can be equivalently converted to the XML data shown in FIG. 3. In the first embodiment, the XML data described by the XML having high description capability is handled. However, in the first embodiment, the data to be handled is not limited to the XML data, and the database 510 can be the RDB.

FIG. 4 is an example of three elements of XML data stored in a database 510. In the XML, an individual part constituting the document structure is referred to as an element, and described by using a tag. Specifically, in the XML, one element is expressed by putting text data between two tags, that is, a tag indicating beginning of the element (start tag) and a tag indicating the end of the element (end tag). The data put between the start tag and the end tag is a text element (text node) included in one element expressed by the start tag and the end tag. In the example in FIG. 4, XML data XD1 to XD3 include a plurality of partial XML data put between <paper> elements. The partial XML data are data related to a title of a document put between <title> elements, data related to a text of the document put between <body> elements, and data for each row put between <P> elements. Thus, data having a plurality of hierarchical structures and meanings is present in one element of XML data.

Figure 5:
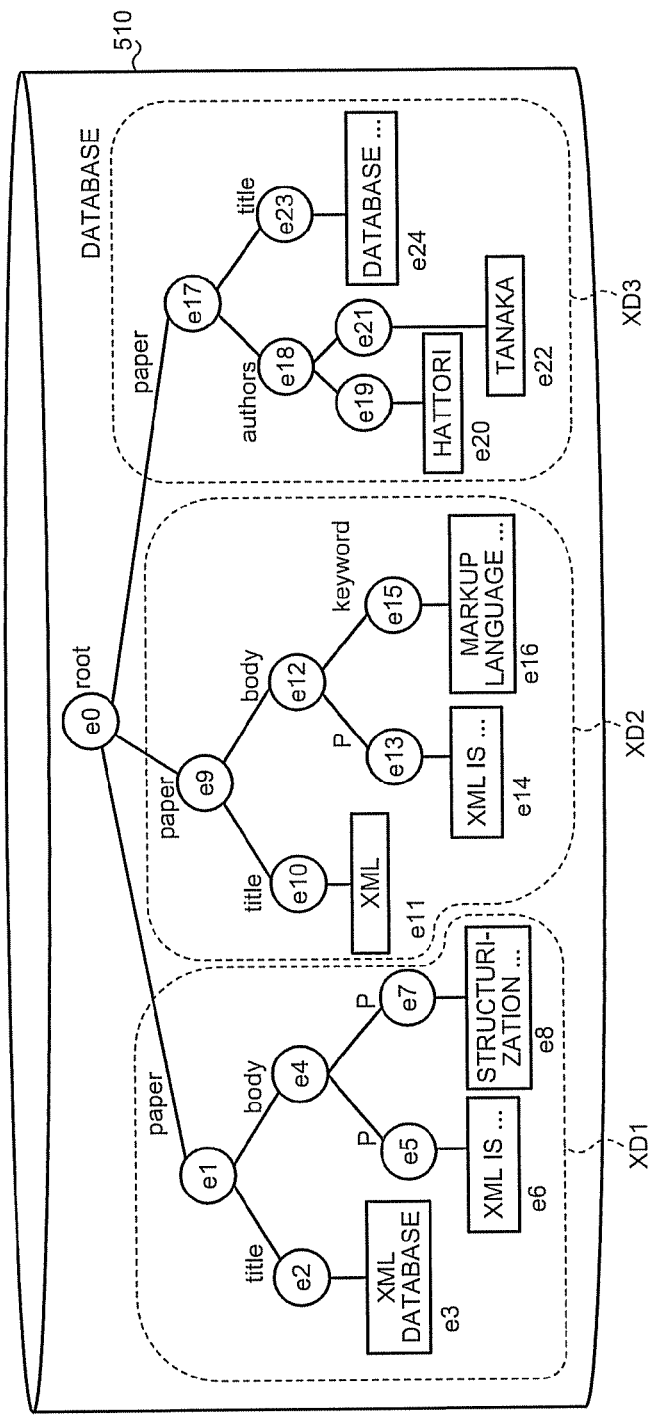
FIG. 5 depicts a physical memory state of the XML data in the database.

FIG. 5 depicts a physical memory state of the XML data in the database 510 as the XML database as an example of the database. It is assumed here that the XML data XD1 to XD3 shown in FIG. 4 are stored in the database 510. The XML data is expressed with an object and a link in a format similar to a document object model (DOM). The DOM is a model for expressing the XML data according to an object oriented manner, and a part constituting the XML data is expressed as an object associated therewith. For example, an element class is defined in the element beforehand, and an attribute class is defined in an attribute beforehand, and these instances are created and expressed. In the DOM, the object is handled as a tree structure (tree). In FIG. 4, there are three <paper> objects immediately below a <root> object, and the <paper> objects are connected from the <root> object by a link indicating a parent-child relationship. There is a text object indicating text data in the lowermost layer of the object.

Object IDs from "e0" to "e24" are respectively allocated to each object. The object ID can uniquely identify the object in the database 510. As the object ID, a physical ID using a file offset indicating a relative position in a file can be used. Alternatively, a logical ID can be additionally used to manage the physical ID and the logical ID in a table in the database.

In such a hardware configuration, various functions to be realized by the database server 51 by executing various programs stored in the memory and the external memory are explained. The database server 51 includes, as shown in FIG. 1, a request receiving unit 511, a request processing unit 512, a result-data managing unit 513, an ID-range determining unit 514, and a result transmitting unit 515. Entities of these respective units are generated on, for example, a memory (for example, a RAM) by the CPU by executing various programs.

The request receiving unit 511 receives a processing request transmitted from the client 50. The request processing unit 512 determines whether the processing request received by the request receiving unit 511 is a data acquisition request for requesting acquisition of the XML data or a real data acquisition request including a global ID (GID) and requesting acquisition of data of the element constituting the XML data. The GID includes database identification information for identifying the database server 51 and the object ID. When the processing request is the normal data acquisition request, the request processing unit 512 acquires the XML data corresponding to the normal data acquisition request from the database 510, and appropriately performs processing such as merge or join with respect to the set of the acquired XML data to generate first result data expressed by an XML format. On the other hand, when the processing request is a real data acquisition request, the request processing unit 512 acquires data of the element corresponding to the GID from the database 510, and generates third result data including the element data (identifier) so that the third result data is stored in the result-data managing unit 513.

The ID-range determining unit 514 determines association between the elements and positioning of the respective elements in the first result data to determine whether the respective elements are to be replaced with the GID, for the respective elements included in the first result data stored in the result-data managing unit 513. Specifically, the ID-range determining unit 514 decomposes the first result data stored in the result-data managing unit 513 for each element to obtain the association between the elements and positioning of the respective elements in the first result data. The ID-range determining unit 514 calculates a priority indicating a priority degree of transmission for respective elements based on a predetermined rule described later, by using the association between the elements and positioning of the respective elements. The association between the elements means a parent-child relationship, and positioning means a position of the element including the sibling relationship. The ID-range determining unit 514 then determines whether the respective elements are to be replaced with the GID by using the priority and a preset threshold. That is, the ID-range determining unit 514 determines whether the priority degree of transmission is high, that is, the respective elements should be transmitted immediately or should be transmitted at the time of requesting real data acquisition, for the respective elements. Accordingly, the ID-range determining unit 514 determines the range of the element to be replaced with a GID (ID range) in the XML data. It is assumed here that the threshold is prestored in, for example, the memory or the external memory. An identification number or an IP address imparted beforehand to the database 51 can be used for the database identification information. In the database system, when there is only one database server, the GID may not include the database identification information. The ID-range determining unit 514 replaces the element, of the elements constituting the XML data, determined to be transmitted at the time of requesting real data acquisition with the GID and generates second result data including the GID and other elements constituting the XML data, so that the second result data is stored in the result-data managing unit 513.

The result-data managing unit 513 temporarily stores the first to the third result data as a memory area. The result transmitting unit 515 transmits the second result data or the third result data stored in the result-data managing unit 513 to the client 50 as the processing result.

Figure 6:
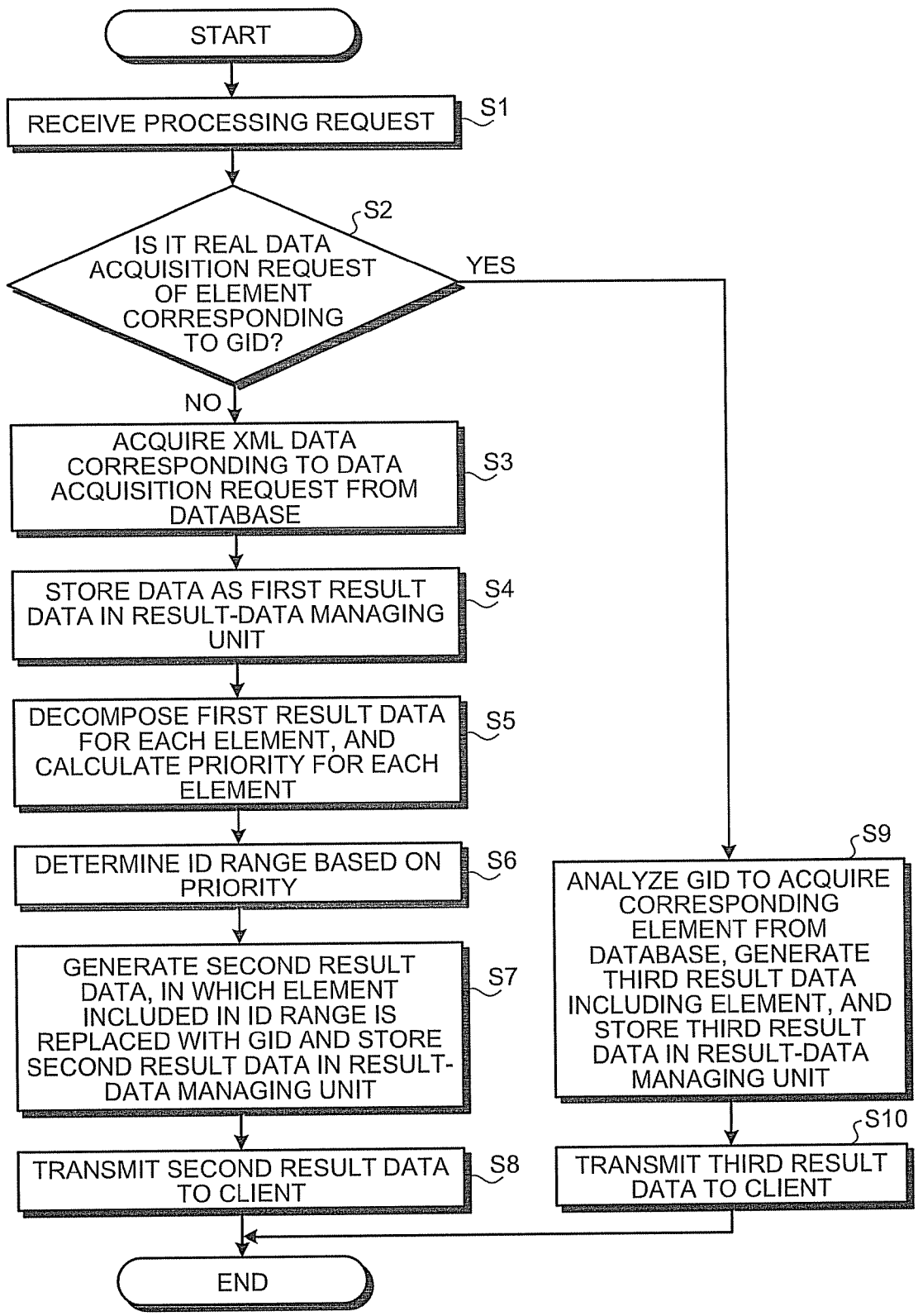
FIG. 6 is a flowchart of a data transfer process procedure performed by a database server.

A data transfer process procedure performed by the database server 51 is explained next with reference to FIG. 6. The request receiving unit 511 of the database server 51 receives the processing request transmitted from the client 50 (Step S1). The request processing unit 512 analyzes the processing request received at Step S1 to determine whether the processing request is the data acquisition request or the real data acquisition request (Step S2). For example, a search condition for searching for the XML data to be acquired and information for specifying the XML data to be acquired are included in the data acquisition request. The GID for specifying the element to be acquired is included in the real data acquisition request. The request processing unit 512 performs determination at Step S2 for the processing request having the above configuration, and when determining that the processing request is the data acquisition request (NO at Step S2), the request processing unit 512 acquires the XML data corresponding to the data acquisition request from the database 510 (Step S3). The request processing unit 512 then appropriately processes the set of the XML data acquired at Step S3, and generates the first result data expressed in the XML format to store the first result data in the result-data managing unit 513 (Step S4).

Figure 7:
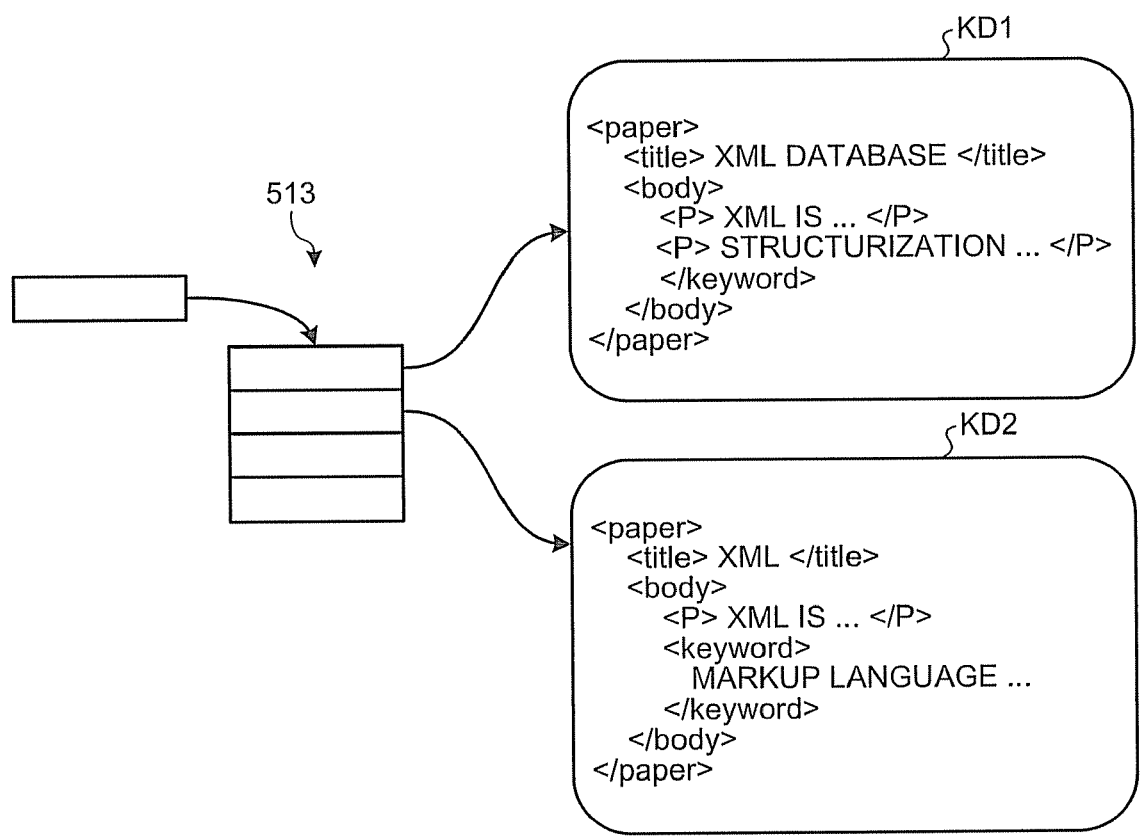
FIG. 7 is an example of first result data stored in a result-data managing unit.

FIG. 7 is an example of the first result data stored in the result-data managing unit 513. Two first result data KD1 to KD2 generated respectively based on the two elements of XML data XD1 to XD2 shown in FIG. 4 are on the storage area of the result-data managing unit 513 and managed in a pointer array to the respective storage areas.

The ID-range determining unit 514 decomposes the first result data stored in the result-data managing unit 513 for each element, and obtains the association between the elements and positioning of the respective elements in the first result data to calculate the priority of the respective elements based on the predetermined rule (Step S5).

Specifically, the ID-range determining unit 514 calculates the priority of the respective elements based on the rule using the importance weighting based on, for example, two criteria described below.

Importance of structure (path weight: pw)
Transmission cost based on size (size)

A value obtained by multiplying inverse numbers of "pw" and "size" is used for the priority. It is assumed that as the value of the priority becomes large, the priority to be transmitted immediately is higher.

Figure 8:
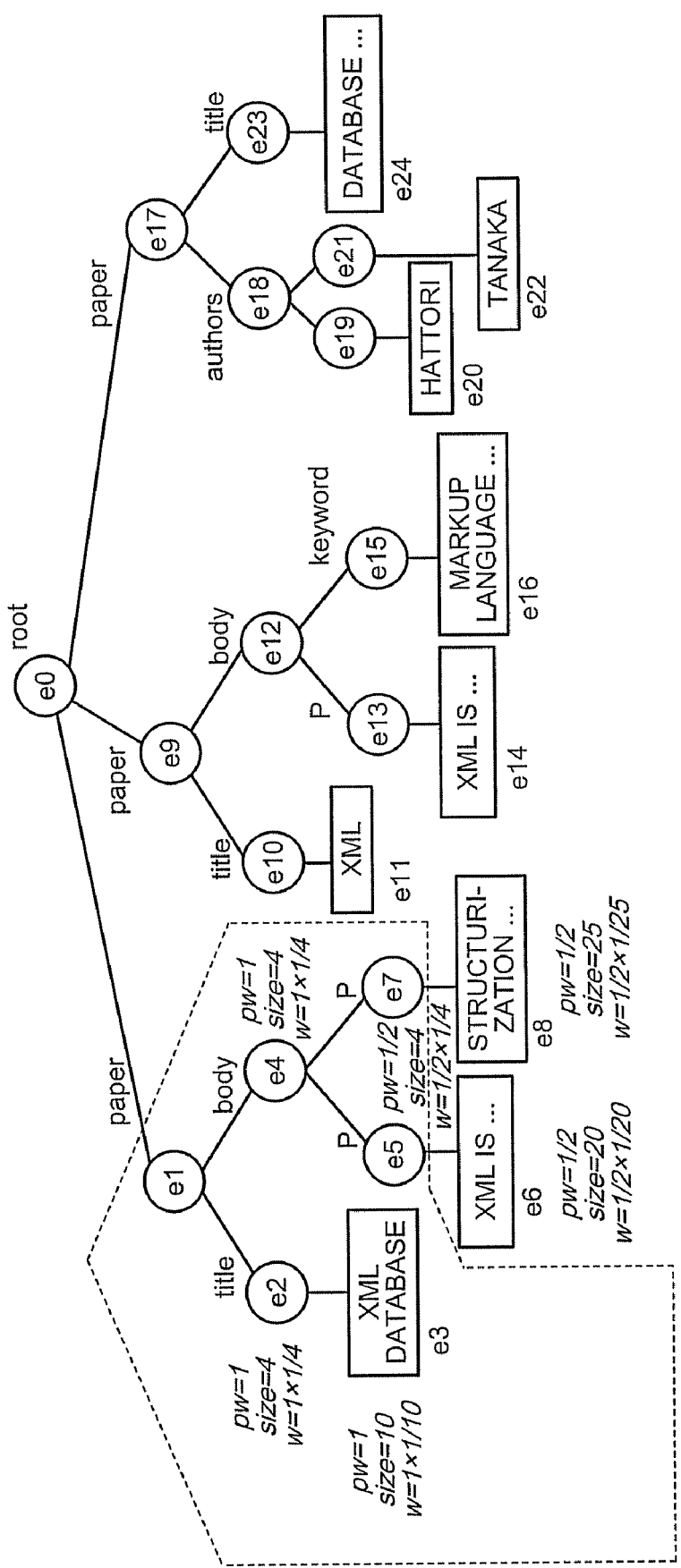
FIG. 8 is an example of a part of a calculation result with respect to respective elements, together with the respective elements in XML data XD1 to XD3 shown in FIG. 5.

For example, in the XML data XD1 to XD3 shown in FIG. 5, the priority with respect to the respective elements e2 to e8 under <paper> is calculated in following manner. FIG. 8 is an example of a part of a calculation result with respect to the respective elements, together with the respective elements in the XML data XD1 to XD3 shown in FIG. 5.

(a) Regarding Element e2
pw: title has only one sibling, and therefore element e2 is "1".
The size is assumed to be "4".
As a result, the priority of element e2 is calculated as "¼×1=¼".

(b) Regarding Element e3
pw: There is only one sibling. Therefore, pw is multiplied by host pw to be "1×1=1".
The size is assumed to be "10", because the text length is "10".
As a result, the priority of element e3 is calculated as "1/10×1=1/10".

(c) Regarding Element e4
pw: There is only one sibling. Therefore, pw is multiplied by host pw to be "1×1=1".
The size is assumed to be "4".
As a result, the priority of element e4 is calculated as "¼×1=¼".

(d) Regarding Element e5 pw: There are two siblings. Therefore, pw is multiplied by host pw to be "½×1=½".

The size is assumed to be "4".

As a result, the priority of element e5 is calculated as "¼×½=⅛".

(e) Regarding Element e6 pw: There is one sibling. Therefore, pw is multiplied by host pw to be "½×1=½".

The size is assumed to be "20", because the text length is "20".

As a result, the priority of element e6 is calculated as "½×1/20=1/40".

(f) Regarding Element e7 pw: There are two siblings. Therefore, pw is multiplied by host pw to be "1×½=½".

The size is assumed to be "4", because the text length is "4".

As a result, the priority of element e7 is calculated as "½×¼=⅛".

(g) Regarding Element e8 pw: There is one sibling. Therefore, pw is multiplied by host pw to be "½×1=½".

The size is assumed to be "25", because the text length is "25".

As a result, the priority of element e8 is calculated as "½×1/25=1/50".

The reason why the size of elements e2, e4, and e5 is assumed to be "4" is to avoid a problem in that the priority of the upper level element becomes higher than that of the lower level element. Thus, when the text length is shorter than "4", the ID-range determining unit 514 carries this to 4, to calculate the priority.

After having calculated the priority of the respective elements in this manner, the ID-range determining unit 514 determines whether to replace the respective elements with the GID by using the priority of the respective elements and the preset threshold. That is, the ID-range determining unit 514 determines whether to transmit the respective elements immediately or transmit the respective elements at the time of requesting real data acquisition (Step S6). It is assumed here that the threshold is, for example, "1/10" by using the priority of the respective elements and the preset threshold. Specifically, the ID-range determining unit 514 determines that the element having priority higher than the threshold is not replaced with the GID and is transmitted immediately. In the above example, elements e1, e2, e3, e4, e5, and e7 among the elements e1 to e8 are determined to be transmitted immediately. The remaining elements e6 and e8 are determined to be transmitted at the time of requesting real data acquisition, and replaced with the GID.

The ID-range determining unit 514 replaces the element determined to be transmitted at the time of requesting real data acquisition, among the elements constituting the first result data (XML data), with the GID including an object ID of the element and database server identification information for identifying the database server 51, and generates the second result data including the GID and other elements constituting the first result data, so that the second result data is stored in the result-data managing unit 513 (Step S7). The result transmitting unit 515 transmits the second result data to the client 50 as the processing result (Step S8).

Figure 9:
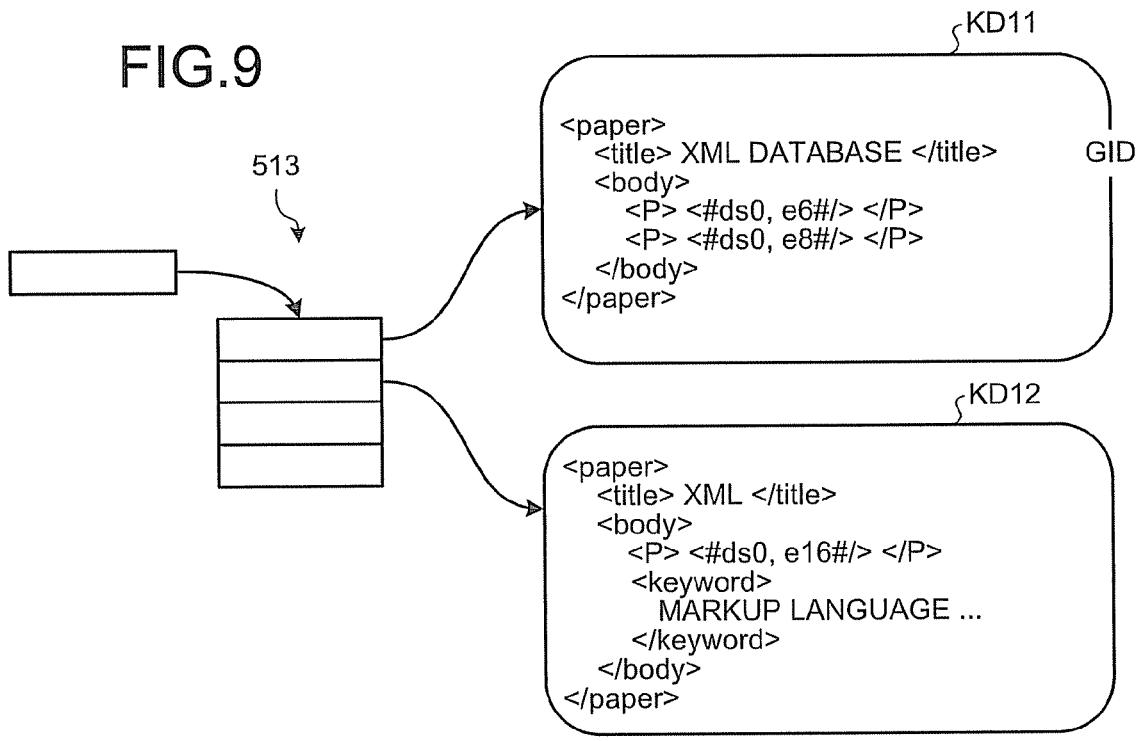
FIG. 9 is an example of second result data stored in the result-data managing unit.

FIG. 9 is an example of the second result data stored in the result-data managing unit 513. Two elements of second result data KD11 to KD12 respectively generated based on the two XML data XD1 to XD2 shown in FIG. 4 are on the storage area of the result-data managing unit 513, and are managed by the pointer array to the respective storage areas. In the second result data in FIG. 9, a part of the elements is replaced with the GID, as compared with the first result data shown in FIG. 7. Specifically, it is shown that element e6 included in the XML data XD1 shown in FIG. 5 is replaced with GID<#ds0, e6#/>, and element e8 is replaced with GID<#ds0, e8#/>. It is also shown that element e16 included in the XML data XD2 is replaced with GID<#ds0, e16#/>. "#ds0" indicates the data identification information, and "e6#", "e8#", and "e16#" respectively indicates the object ID.

In a conventional case, the data to be transmitted to the client 50 is the first result data as shown in FIG. 7, and all the data are transmitted to the client 50 or are sequentially transmitted by using a commend such as "fetch" or API. On the other hand, in the first embodiment, the data to be transmitted to the client 50 is the second result data as shown in FIG. 9. Accordingly, a transfer amount of data to be transmitted to the client 50 can be reduced considerably, as compared with the first result data.

Returning to FIG. 6, when the processing request is the real data acquisition request at Step S2 (YES at Step S2), the request processing unit 512 analyzes the GID included in the real data acquisition request to acquire the data of the element corresponding to the object ID included in the GID from the database 510, and generates the third result data including the data of the element, so that the third result data is stored in the result-data managing unit 513 (Step S9). The result transmitting unit 515 then transmits the third result data to the client 50 as the processing result (Step S10).

Figure 10:
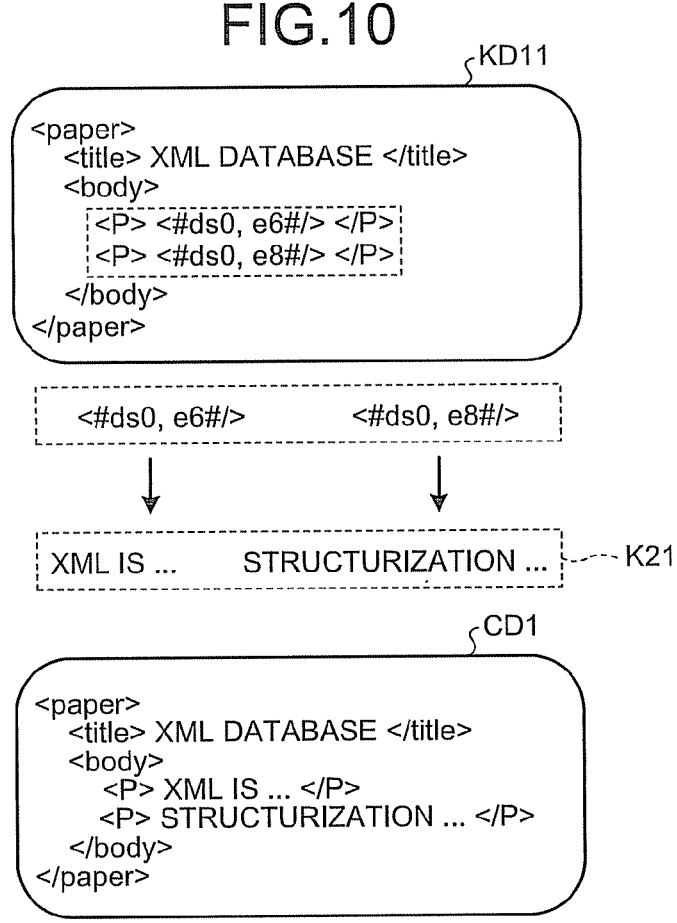
FIG. 10 is an example of the second result data and third result data acquired by a client.

On the other hand, the client 50 receives the second result data transmitted from the database server 51 at Step S8 to detect the GID included in the second result data, as required by an application, and transmits the real data acquisition request including the detected GID to the database server 51. As a result, the third result data including the data of the element corresponding to the GID is transmitted from the database server 51 at Step S10, so that the client 50 can acquire the data of the element corresponding to the GID. FIG. 10 is an example of the second result data and the third result data acquired by the client 50. In FIG. 10, GID <#ds0, e6#/> and <#ds0, e8#/> are extracted from the second result data KD11, and third result data K21 including the data of the respective elements corresponding to the respective GIDs is acquired. The client 50 can acquire data CD1 by replacing the GID in the second result data KD11 with the data of the element included in the third result data K21.

In the application of the client 50, if only the <title> element shown in FIG. 10 is required, even if there is the element replaced with the GID in or below the <body> element, the <body> element itself is skipped. Therefore, the GID in or below the <body> element need not be detected, and the data of the element corresponding to the GID need not be acquired. Therefore, acquisition of the useless data can be reduced.

The element determined to have low priority is replaced with the GID based on the priority of the respective elements constituting the data, and transmitted to the client 50. Accordingly, transfer of the useless data can be reduced while required data is being transferred.

This is because when the data size increases, actually in the application of the client 50, only a part of the elements in the data is used, and the subsequent elements are not required. For example, a full-text search is assumed here. In the case of the <paper> element described above, only a list of the <title> element is required and the <body> may not be required. In the nonstandard data such as the XML data, however, the structure thereof is unknown unless the database is actually accessed. Therefore, it is difficult to determine beforehand whether the element is required by the application of the client 50. In the first embodiment, therefore, transfer of useless data can be approximately reduced by determining beforehand whether the element is required on the database server 51 side, which accesses the real data.

Figure 11:
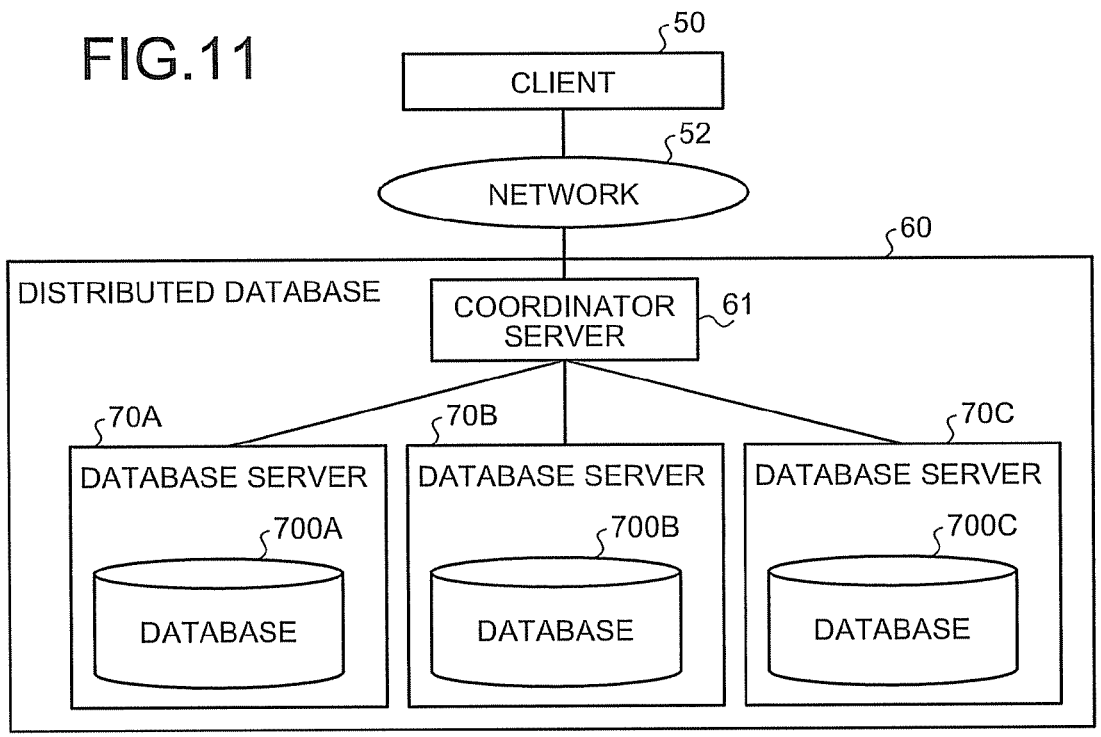
FIG. 11 is a block diagram of a configuration of a database system according to a second embodiment of the present invention.

FIG. 11 is a block diagram of a configuration of a database system according to a second embodiment of the present invention. The database system according to the second embodiment is a distributed database system. The distributed database system includes the client 50 and a distributed database 60, where the client 50 and the distributed database 60 are connected via the network 52. The distributed database 60 has a coordinator server 61 and a plurality of database servers 70A to 70C.

The client 50 transmits a processing request to the coordinator server 61 via the network 52 and receives a processing result from the coordinator server 61.

The coordinator server 61 is connected to the client 50 and the database servers 70A to 70C. The coordinator server 61 receives a search request (query) for requesting search of the XML data corresponding to a condition, or a processing request such as a data acquisition request by cursor fetching, a data acquisition request for requesting acquisition of specified XML data, or a real data acquisition request for requesting acquisition of data of an element corresponding to the GID, and performs the processing corresponding to the processing request to transmit a processing result to the client 50. When performing the processing corresponding to the processing request received from the client 50, the coordinator server 61 makes a processing request to the database servers 70A to 70C, receives the processing result from the database servers 70A to 70C, appropriately processes the processing result to generate result data of the processing result, and transmits the result data to the client 50.

The database server 70A has a database 700A for storing XML data, which is similar to the database 510, acquires from the database 700A the XML data corresponding to the processing request from the coordinator server 61, and generates the result data by processing the data, to transmit result data to the coordinator server 61 as the processing result. The database server 70B has a database 700B for storing XML data, and realizes the same function as that of the database server 70A. The database server 70C has a database 700C for storing XML data, and realizes the same function as that of the database server 70A.

For example, it is assumed here that the XML data XD1 shown in FIG. 4 is stored in the database 700A, the XML data XD2 is stored in the database 700B, and the XML data XD3 is stored in the database 700C. The physical memory state of the XML data in the distributed database 60, in which the XML data XD1 to XD3 are stored, is the same as that shown in FIG. 5. When the database servers 70A to 70C are not respectively distinguished from each other, these are simply described as the database server 70, and the databases 700A to 700C are not respectively distinguished from each other, these are simply described as the database 700.

Generally, in the distributed database, the whole database is often divided and allocated to a plurality of database servers in a unit of data without superposition. This is referred to as horizontal division of the database. Also in the second embodiment, it is assumed that the XML data are stored without superposition respectively in the databases 700A to 700C. It is also assumed that the database identification information is respectively allocated to the databases 700A to 700C. In such a configuration, the coordinator server 61 needs to make an appropriate processing request to the database server 70 and appropriately process data acquired as a processing result from the database server 70, in order to acquire a processing result satisfying the processing request from the client 50.

Figure 12:
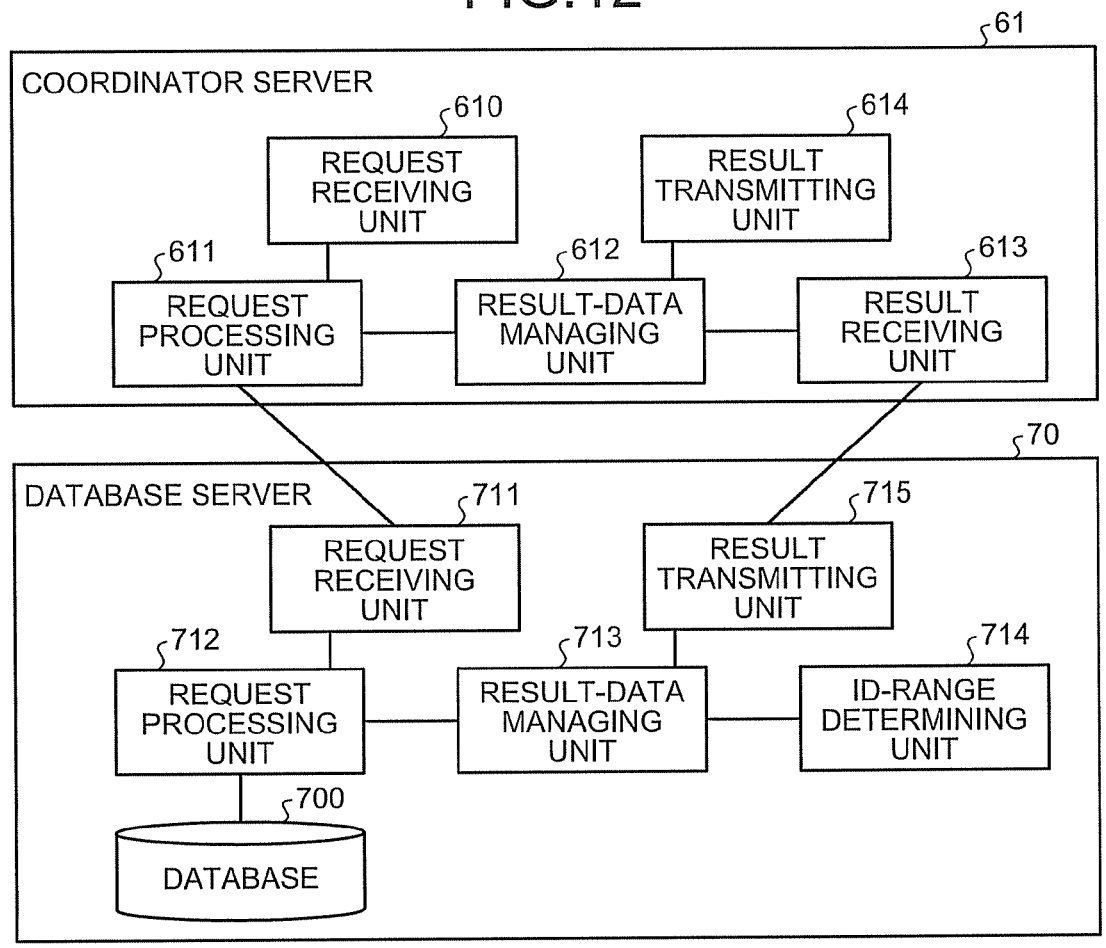
FIG. 12 is an example of a functional configuration of a coordinator server and a database server.

The configuration of the coordinator server 61 is explained next in detail next. The coordinator server 61 has a hardware configuration using the normal computer explained in the first embodiment. In such a hardware configuration, various functions to be realized by a CPU included in the coordinator server 61 by executing various programs stored in the memory and the external memory are explained. FIG. 12 is an example of a functional configuration of the coordinator server 61 and the database server 70. The coordinator server 61 includes a request receiving unit 610, a request processing unit 611, a result-data managing unit 612, a result receiving unit 613, and a result transmitting unit 614. The entities of these respective units are generated on, for example, a memory (for example, a RAM) by the CPU by executing the various programs.

The request receiving unit 610 receives the processing request transmitted from the client 50. The request processing unit 611 determines whether the processing request received by the request receiving unit 610 is a query (XQuery), a data acquisition request for requesting acquisition of specified XML data, or a real data acquisition request for requesting acquisition of data of the element corresponding to the XML data. When the processing request is the query, the request processing unit 611 generates a code from the query. A method for generating the code from the query is described in, for example, JP-A H06-195382 (KOKAI). The request processing unit 611 transmits the generated code to the database server 70, and receives a tenth result data generated as the processing result based on the execution result of the code from the database server 70 via the result receiving unit 613 so that the tenth result data is stored in the result-data managing unit 612. The tenth result data includes respective pieces of database identification information of the database servers 70A to 70C, but does not include the XML data itself. The request processing unit 611 sums up the number of items of the tenth result data (read result) to generate an eleventh result data indicating the summed up result, so that the eleventh result data is stored in the result-data managing unit 612.

When the processing request is the data acquisition request, the request processing unit 611 refers to the database identification information included in the tenth result data stored in the result-data managing unit 612 to transmit a data acquisition request for requesting acquisition of the relevant XML data to the database server 70 (at least one of the database servers 70A to 70C) that stores the XML data. The request processing unit 611 also receives a twelfth result data including the XML data acquired in response to the data acquisition request from the database server 70 via the result receiving unit 613, so that the twelfth result data is stored in the result-data managing unit 612.

When the processing request is the real data acquisition request for requesting the data of the element corresponding to the GID, the request processing unit 611 transmits a real data acquisition request for requesting acquisition of the data of the element corresponding to the object ID included in the GID to the database server 70 specified by database specification information included in the GID. The request processing unit 611 receives thirteenth result data including the data of the element corresponding to the real data acquisition request from the database server 70 via the result receiving unit 613, so that the thirteenth result data is stored in the result-data managing unit 612.

The result-data managing unit 612 temporarily stores the tenth to the thirteenth result data as a memory area. The result receiving unit 613 receives the data transmitted from the database server 70. The result transmitting unit 614 transmits the eleventh result data, the twelfth result data, or the thirteenth result data stored in the result-data managing unit 612 to the client 50 as the processing result.

The XQuery transmitted from the client 50 is explained. The XQuery is a functional language for query to the database that stores the XML data, and the feature thereof is For-Let-Where-Return (FLWR) syntax. Query language in a relational database (RDB) is SQL. While SQL is declaratory language, XQuery has many features as the functional language. The language specification of XQuery is explained from a standpoint of procedure.

The syntax of for-clause is "for variable in expression". The syntax of for-clause has a meaning of substituting one satisfying the expression in the variable to loop. The syntax of let-clause is "let variable:=expression". The syntax of let-clause has a meaning of putting ones satisfying the expression together and substituting it in the variable as a sequence. The sequence is a flat list. A where-clause is for limiting the loop repeated by F. The syntax of where-clause is "where expression". The syntax of where-clause has a meaning that only one satisfying the expression is looped and others skip the loop. A return-clause is for formatting a result of processing of the XQuery. The syntax of return-clause is "return expression". The syntax of return-clause can describe arbitrary XML data including a variable. The syntax of the variable is "$ character string". The variables having the same character string are regarded as the same, except for a case that double declarations are made by nested query or the like. As a path operator for specifying a hierarchy condition between elements in the XML data, the XQuery includes the following elements.

"/": Operator indicating that elements have parent-child relationship.

"//": Operator indicating that elements have ancestor-descendant relationship.

".": Arbitrary element.

FIG. 13 depicts an XQuery data structure as an example of a query requesting acquisition of XML data that fulfils conditions. The XQuery shown in FIG. 4 requests that "a text having a descendant returns data referred to as paper in the database including "XML".

FIG. 14 is an example of a code generated by the request processing unit 611 from the XQuery shown in FIG. 13. The code indicates a procedure for processing the XQuery. A command having a basic function such as direct product, natural join, or link update is referred to as an operator. The operator updates internal data. Input and output between the operators is performed by using a pointer of an internal table, an internal table ID, or the like. The code is a sequence of operators, and normally has an inverse tree structure, designating the operator as a node.

In this example, the code includes the operator and a sequence of operands such as:

scanPath: take out an object ID set of <paper> element
scanData: take out text element under <paper> element
textContains: leave text element including only "XML"
sendXML: return character string expressed in XML format regarding remaining text element.

For example, when such a code is executed by the database servers 70A to 70C that stores any one of the XML data XD1 to XD3 shown in FIG. 4, elements "e1" and "e9" shown in FIG. 5 are left, and a character string expressed in the XML format is generated for the element after sendXML is executed. For example, character strings corresponding to the XML data XD1 to XD2 in FIG. 4 are generated.

A functional configuration of the database server 70 is explained next in detail. The database server 70 includes a request receiving unit 711, a request processing unit 712, a result-data managing unit 713, an ID-range determining unit 714, and a result transmitting unit 715 as in the first embodiment. Points different from the request receiving unit 511, the request processing unit 512, the result-data managing unit 513, the ID-range determining unit 514, and the result transmitting unit 515 in the first embodiment are described below.

The request receiving unit 711 does not directly receive the processing request from the client 50, but receives the processing request transmitted from the coordinator server 61 in response to the processing request from the client 50. The request processing unit 712 accesses the database 700 in response to the processing request received by the request receiving unit 711 to read the data, appropriately processes the data, and temporarily stores the processing result in the result-data managing unit 713. Specifically, when the processing request received by the request receiving unit 711 is the code, the request processing unit 712 executes the code, temporarily stores the XML data (twentieth result data) acquired as a result in the result-data managing unit 713, to generate the tenth result data including the same number of pieces of database identification information as that of the XML data, and temporarily stores the tenth result data in the result-data managing unit 713. The tenth result data is generated for the coordinator server 61 to sum up the number of items of the XML data. For example, it is assumed that the respective XML data stored in the respective databases 700A to 700C can be uniquely identified in the respective databases. When the processing request is a data acquisition request, the request processing unit 712 extracts the XML data to be acquired from the twentieth result data stored in the result-data managing unit 713. When the processing request is a real data acquisition request for requesting acquisition of data of the element corresponding to the GID, the request processing unit 712 reads the data of the element corresponding to the object ID included in the GID from the database 700 to temporarily store the thirteenth result data including the data in the result-data managing unit 713.

The ID-range determining unit 714 obtains the association between the elements and positioning of the respective elements in the XML data for the respective elements included in the XML data extracted by the request processing unit 712, as in the first embodiment, to determine whether the respective elements are to be replaced with the GID. The ID-range determining unit 714 replaces the element with the GID, of the element constituting the XML data, determined to be transmitted at the time of requesting real data acquisition and to be replaced with the GID, and generates the twelfth result data including the GID and other elements constituting the XML data, to store the twelfth result data in the result-data managing unit 713.

The result transmitting unit 515 appropriately transmits the tenth to the thirteenth result data stored in the result-data managing unit 612 not to the client 50 but to the coordinator server 61.

Figure 15:
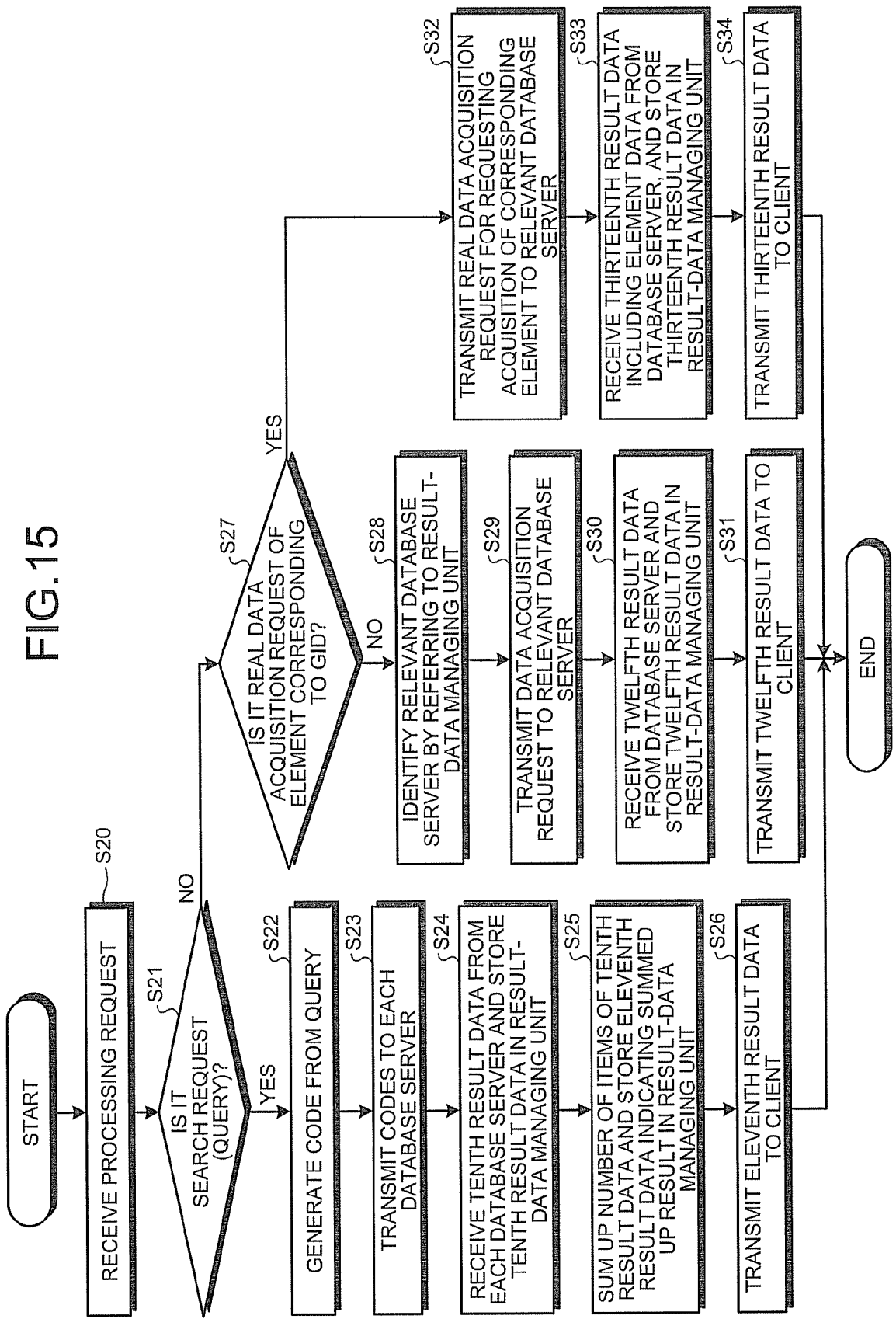
FIG. 15 is a flowchart of a data transfer process procedure performed by the coordinator server.
Figure 16:
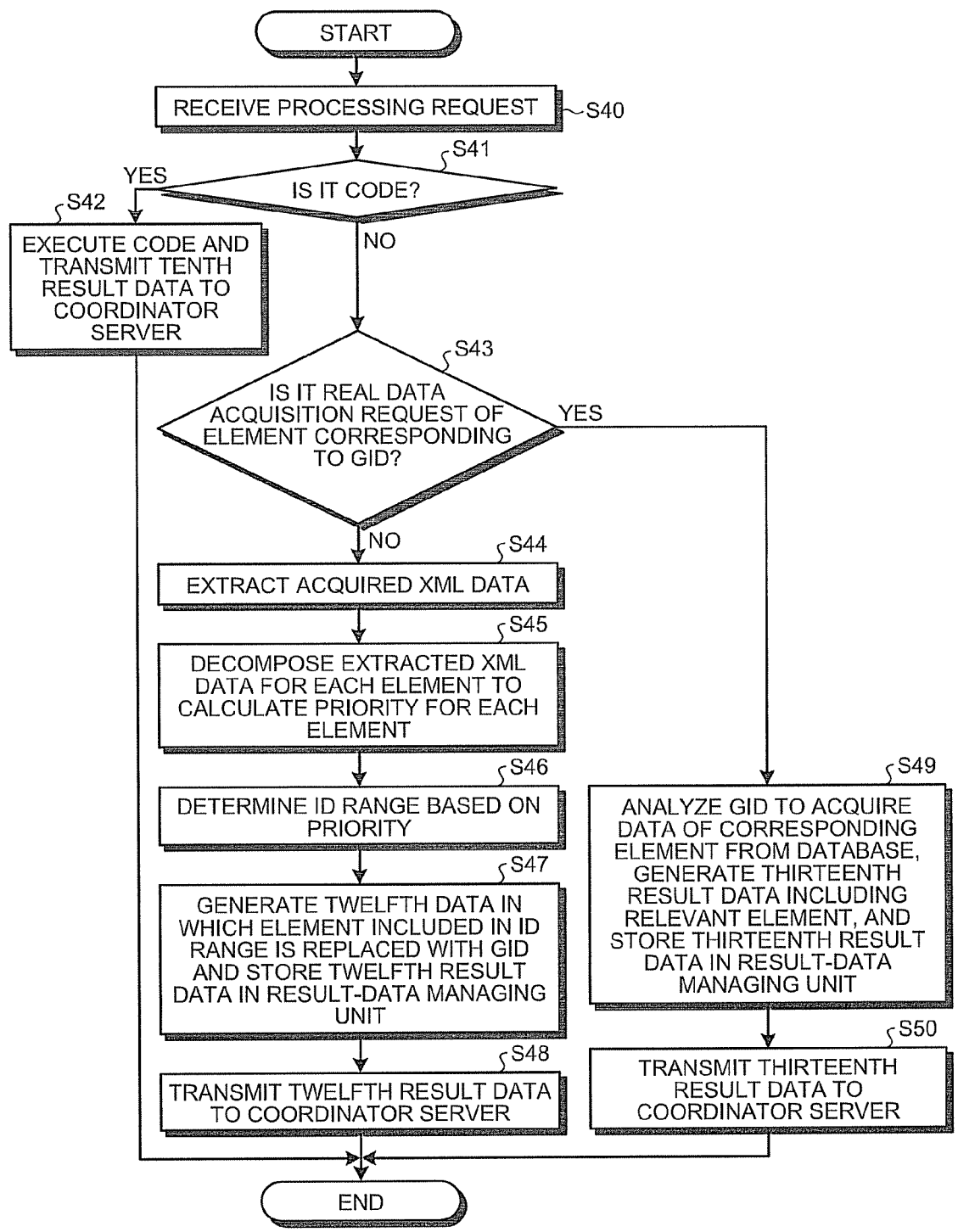
FIG. 16 is a flowchart of a data transfer process procedure performed by the database server.

A data transfer process procedure performed by the distributed database 60 is explained with reference to FIGS. 15 and 16. FIG. 15 is a flowchart of a data transfer process procedure performed by the coordinator server 61. The request receiving unit 610 in the coordinator server 61 receives a processing request transmitted from the client 50 (Step S20). The request processing unit 611 determines whether the processing request received at Step S20 is a search request (query) or a data acquisition request (Step S21). When the processing request is the query (YES at Step S21), the request processing unit 611 generates a code for making the respective database servers 70A to 70C search for the XML data corresponding to the condition (Step S22), and transmits these codes to the respective database servers 70A to 70C (Step S23).

When the tenth result data including the same number of pieces of data identification information as that of the relevant XML data are respectively transmitted as a result of execution of the code by the respective database servers 70, the result receiving unit 613 in the coordinator server 61 receives the tenth result data. The request processing unit 611 stores the tenth result data in the result-data managing unit 612 (Step S24). The request processing unit 611 sums up the number of items of the tenth result data to generate the eleventh result data indicating the summed up result, so that the eleventh result data is stored in the result-data managing unit 612 (Step S25). Thereafter, the result transmitting unit 614 transmits the eleventh result data as the processing result to the client 50 (Step S26).

There is a case that the client 50 transmits a data acquisition request to the coordinator server 61 by cursor fetching or the like, after having acquired the eleventh result data indicating the number of items. In this case, the processing request received at Step S20 becomes the data acquisition request (NO at Step S27), and the coordinator server 61 performs processing at and after Step S28.

At Step S28, the request processing unit 611 refers to the database identification information included in the tenth result data stored in the result-data managing unit 612, to identify the database server 70 (at least one of the database servers 70A to 70C) that stores the relevant XML data, and transmits a data acquisition request for requesting the relevant XML data to the database server 70 (Step S29).

When the database server 70 transmits the twelfth result data including the XML data acquired in response to the data acquisition request, the result receiving unit 613 in the coordinator server 61 receives the twelfth result data. The request processing unit 611 stores the twelfth result data in the result-data managing unit 612 (Step S30). The result transmitting unit 614 transmits the twelfth result data as the processing result to the client 50 (Step S31).

For example, the twelfth result data including the XML data acquired by the respective database servers 70 in response to the data acquisition request with respect to the XML data KD1 to KD2 shown in FIG. 4 becomes the same as the second result data KD11 to KD12 shown in FIG. 9. Accordingly, the client 50 acquires the XML data in which a part of the element is replaced with the GID. After having acquired the XML data, the client 50 may transmit a real data acquisition request for requesting acquisition of data of the element corresponding to a certain GID, of the elements replaced with the GID, to the coordinator server 61, as required in the application. In this case, the processing request received at Step S20 becomes the real data acquisition request for requesting acquisition of data of the element corresponding to the GID (YES at Step S27), and the coordinator server 61 performs processing at and after Step S32.

At Step S32, the request processing unit 611 transmits the real data acquisition request for requesting acquisition of data of the element corresponding to the object ID included in the GID to the database server 70 specified by the database specification information included in the GID.

When the database server 70 transmits the thirteenth result data including the data of the element corresponding to the real data acquisition request, the result receiving unit 613 in the coordinator server 61 receives the thirteenth result data. The request processing unit 611 stores the thirteenth result data in the result-data managing unit 612 (Step S33). The result transmitting unit 614 transmits the thirteenth result data as the processing result to the client 50 (Step S34).

In this case, for example, as in the first embodiment, as shown in FIG. 10, GID <#ds0, e6#/> and <#ds0, e8#/> are extracted with respect to the twelfth result data (second result data) KD 11, and the thirteenth result data (third result data) K21 including the data of each element corresponding to each GID is acquired. Because the GID in the twelfth result data KD11 is replaced with the element included in the thirteenth result data K21, the client 50 can acquire the data CD1.

A data transfer process procedure performed by the distributed database 60 is explained with reference to FIG. 16. The request receiving unit 610 in the database server 70 receives a processing request transmitted from the client 50 (Step S40). The request processing unit 611 determines whether the processing request received at Step S40 is a code or a data acquisition request (Step S41). When the processing request is the code (YES at Step S41), the request processing unit 712 executes the code, temporarily stores the XML data (twentieth result data) acquired as a result in the result-data managing unit 713, and transmits the tenth result data including the same number of pieces of database identification information as that of the XML data via the result transmitting unit 515 (Step S42).

When the processing request received at Step S40 is the data acquisition request (NO at Step S41), the request processing unit 712 determines whether the data acquisition request is the real data acquisition request for requesting acquisition of data of the element corresponding to the GID (Step S43). When the determination result is negative, the request processing unit 712 extracts the XML data to be acquired from the second result data stored in the result-data managing unit 713 (Step S44). The ID-range determining unit 714 decomposes the XML data extracted at Step S44 for each element in the same manner as in the first embodiment, to obtain the association between the elements and positioning of the respective elements in the XML data. The ID-range determining unit 714 calculates the priority of the respective elements based on the predetermined rule (Step S45), and determines whether the respective elements are to be replaced with the GID by using the priority and the preset threshold. That is, the ID-range determining unit 714 determines whether the respective elements are to be immediately transmitted or transmitted at the time of requesting real data acquisition (Step S46). The ID-range determining unit 714 replaces the element determined to be transmitted at the time of requesting real data acquisition with the GID, of the elements constituting the XML data, and generates the twelfth result data including the GID and other elements constituting the XML data, so that the twelfth result data is stored in the result-data managing unit 713 (Step S47). The result transmitting unit 515 transmits the twelfth result data to the coordinator server 61 (Step S48).

When the processing request received at Step S40 is the real data acquisition request for requesting acquisition of data of the element corresponding to the GID (YES at Step S43), the request processing unit 712 reads the data of the element corresponding to the object ID included in the GID from the database 700 and temporarily stores the thirteenth result data including the element data in the result-data managing unit 713 (Step S49). The result transmitting unit 515 transmits the thirteenth result data to the coordinator server 61 (Step S50).

According to the above configuration, transfer of useless data can be reduced in the distributed database, in which data is distributed to a plurality of databases, while transferring necessary data.

In the embodiments, various programs to be executed by the coordinator server 61 can be stored on a computer connected to the network such as the Internet, and downloaded via the network. Further, various programs can be recorded on a computer readable recording medium such as a CD-ROM, a flexible disk (FD), a CD-recordable (CD-R), and a digital versatile disk (DVD), and provided in an installable or executable format file. The same applies to various programs executed by the database server 70.

In the embodiments, the ID-range determining unit determines the ID range by using the threshold; however, the present invention is not limited thereto. For example, the ID-range determining unit specifies the total amount of the transfer size of the result data that can be transferred as the processing result, includes the elements as much as possible in the result data in decreasing order of priority, and the element that cannot be included therein can be converted to the GID.

Further, the ID-range determining unit can determine the ID range by using at least one or at least two combinations of the depth of the element, the size of the element, and the number of elements of the same type, that is, the number of elements having the same tag name, which appear repetitively.

The ID-range determining unit can acquire hint information related to calculation of the priority from the client 50, to prioritize the respective elements based on the hint information.

Further, the ID-range determining unit can leave a real data acquisition history with the GID, and refer to the real data acquisition history to dynamically change a value, for example, by increasing the priority of the element having a high acquisition probability.

In the embodiments, the GID is expressed by a special tag. However, the GID can be expressed by using processing instructions (PI). The PI is provided for embedding a command to a certain application in the XML data. In an event-handler based XML parser such as a simple API for XML (SAX), the GID can be detected on the application side of the client 50 by defining the GID by the PI event handler.

Figure 17:
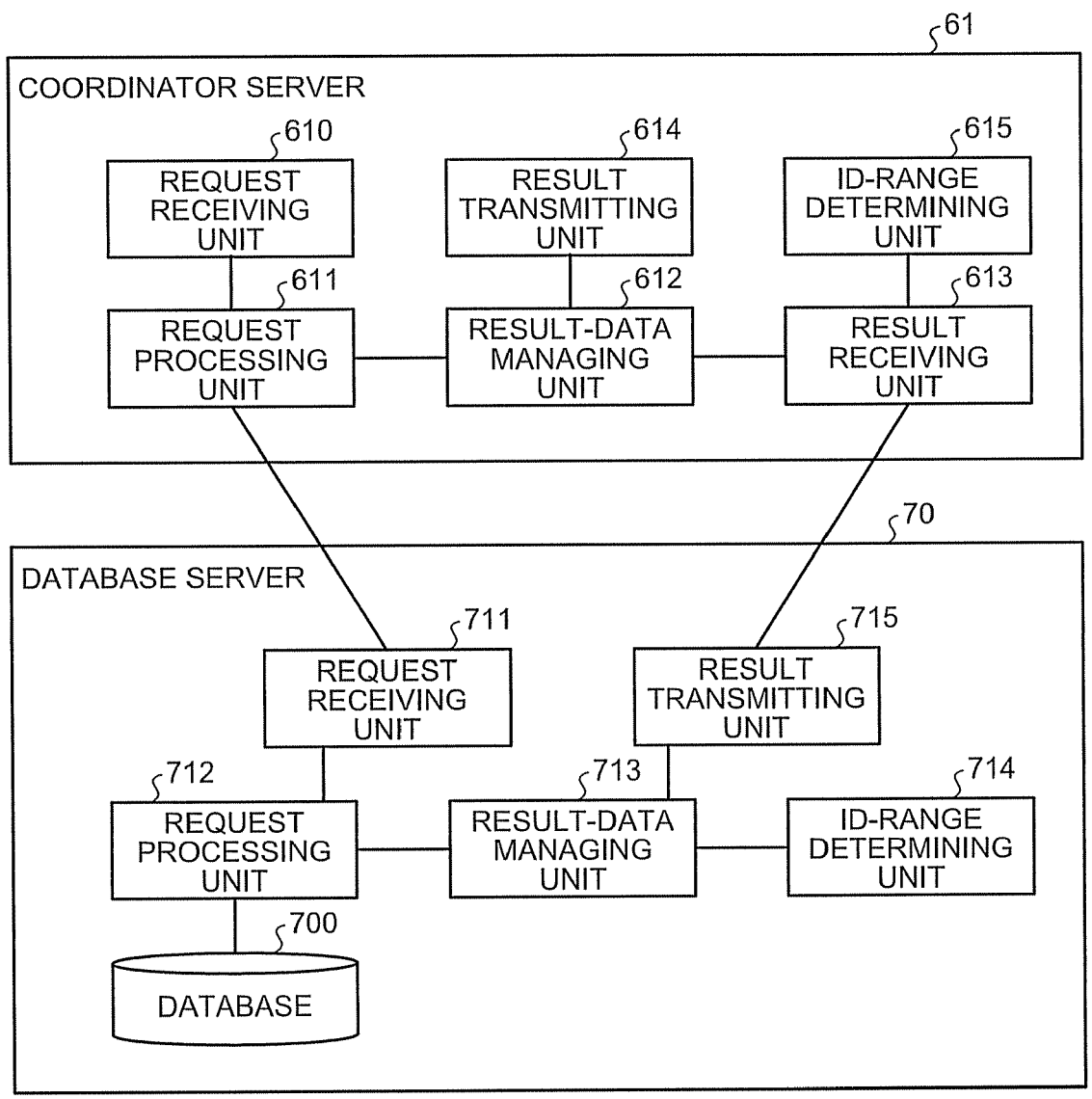
FIG. 17 is an example of a configuration in which the coordinator server includes an ID-range determining unit.

In the second embodiment, the coordinator server 61 can have the function for calculating the priority of the element to determine the GID of the element based on the priority of the element, as in the ID-range determining unit 714 of the database server 70. FIG. 17 is an example of a configuration in which the coordinator server 61 includes an ID-range determining unit 615. According to such a configuration, not only the database server 70 but also the coordinator server 61 determines the ID range, thereby enabling to improve the responsiveness of the client 50.

Further, such a configuration that the database server 70 does not include the ID-range determining unit 714 can be also used. In this case, the ID-range determining unit 615 in the coordinator server 61 can determine the ID range for the XML data to be acquired by the client 50 to generate data in which the element is appropriately replaced with the GID based on the determination result, and transmit the data to the client 50.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A server comprising:
    a receiving unit that receives a first processing request from a client, the first processing request requesting acquisition of data including a plurality of elements from a database;
    an acquiring unit that acquires first data including the elements and data structure information indicating association between the elements and positioning of the elements in the first data from the database in response to the first processing request;
    a determining unit that determines whether to replace each of the elements with an identifier based on the data structure information to set an element determined to be replaced with the identifier as a first element and the elements other than the first element as second elements;
    a generating unit that replaces the first element with a first identifier and generates a second data including the first identifier and the second elements;
    a transmitting unit that transmits the second data to the client; and
    a processor that executes at least the determining unit, wherein
    the determining unit includes:
        a calculating unit that calculates a priority of transmission of each of the elements included in the first data based on the data structure information, and
        a priority determining unit that determines which of the elements has the priority that is equal to or less than a predetermined threshold to be replaced with the identifier.

2. The server according to claim 1, wherein the identifier includes database identification information and an object identification.

3. The server according to claim 1, wherein
    the receiving unit receives the first processing request via a second server connected to the client, and
    the transmitting unit transmits the second data to the client via the second server.

4. The server according to claim 3, wherein
    the receiving unit receives a processing code converted into a format executable by the server from the client via the second server based on a second processing request requesting a search of data, and
    the acquiring unit includes
        a reading unit that reads the first data and the data structure information from the database by executing the processing code,
        a first generating unit that generates result data indicating a result reading the first data, and
        a first transmitting unit that transmits the result data to the second server.

5. The server according to claim 4, wherein when the receiving unit receives a third processing request requesting acquisition of the first data and the data structure information from the client via the second server after receiving the processing code, the determining unit determines whether to replace each of the elements read by the read unit with the identifier based on the data structure information.

6. The server according to claim 5, further comprising:
    a second generating unit that generates, when the receiving unit receives a fourth processing request requesting acquisition of the first element replaced with the first identifier, third data including the first element before being replaced with the first identifier; and a second transmitting unit that transmits the third data to the client via the second server.

7. The server according to claim 6, wherein the generating unit generates second data in which the first element is replaced with the first identifier including server specification information for specifying the server and element specification information for specifying the first element in the first data.

8. The server according to claim 7, wherein in a case where the server is specified by the second server based on the server specification information included in the first identifier, when the receiving unit receives the fourth processing request requesting acquisition of the first element specified by the element specification information included in the first identifier, the second generating unit generates the third data including the first element specified by the element specification information included in the first identifier.

9. The server according to claim 1, wherein
the database includes at least one first database from among a plurality of distributed databases, and
the acquiring unit acquires the first data and the data structure information from the first database in response to the first processing request.

10. The server according to claim 1, wherein
the database is connected to at least one database server having a plurality of distributed databases, and
the acquiring unit makes a request for acquiring data to the database server to acquire the first data and the data structure information from the database server in response to the first processing request.

11. The server according to claim 1, wherein at least one of the data, the first data, and the second data is expressed in extensible markup language, having a hierarchical structure.

12. The server according to claim 11, wherein the first determining unit uses the data structure information to determine whether to replace each of the elements with the identifier by using at least one of depth of the element, size of the element, and number of same elements appearing repetitively.

13. A data transfer method comprising:
receiving a first processing request from a client, the first processing request requesting acquisition of data including a plurality of elements from a database;
acquiring first data including the elements and data structure information indicating association between the elements and positioning of the elements in the first data from the database in response to the first processing request;
determining whether to replace each of the elements included with an identifier based on the data structure information to set an element determined to be replaced with the identifier as a first element and the elements other than the first element as second elements;
replacing the first element with a first identifier;
generating a second data including the first identifier and the second elements; and
transmitting the second data to the client; wherein
the determining includes:
calculating a priority of transmission of each of the elements included in the first data based on the data structure information, and
determining which of the elements has the priority that is equal to or less than a predetermined threshold to be replaced with the identifier.

14. A computer-readable recording medium that stores therein a computer program when executed causing a computer to execute:
receiving a first processing request from a client, the first processing request requesting acquisition of data including a plurality of elements from a database;
acquiring first data including the elements and data structure information indicating association between the elements and positioning of the elements in the first data from the database in response to the first processing request;
determining whether to replace each of the elements with an identifier based on the data structure information to set an element determined to be replaced with the identifier as a first element and the elements other than the first element as second elements;
replacing the first element with a first identifier;
generating a second data including the first identifier and the second elements; and
transmitting the second data to the client; wherein
the determining includes:
calculating a priority of transmission of each of the elements included in the first data based on the data structure information, and
determining which of the elements has the priority that is equal to or less than a predetermined threshold to be replaced with the identifier.

* * * * *